US008879800B2

(12) United States Patent
Trojanova et al.

(10) Patent No.: US 8,879,800 B2
(45) Date of Patent: Nov. 4, 2014

(54) QUALITY DRIVEN IMAGE PROCESSING FOR OCULAR RECOGNITION SYSTEM

(75) Inventors: Jana Trojanova, Prague (CZ); Saad J. Bedros, West St. Paul, MN (US)

(73) Assignee: Honeywell International Inc., Morristown, NJ (US)

( * ) Notice: Subject to any disclaimer, the term of this patent is extended or adjusted under 35 U.S.C. 154(b) by 525 days.

(21) Appl. No.: 13/161,069

(22) Filed: Jun. 15, 2011

(65) Prior Publication Data
US 2012/0321142 A1    Dec. 20, 2012

(51) Int. Cl.
    *G06K 9/00*        (2006.01)
    *G06K 9/62*        (2006.01)
    *G06K 9/03*        (2006.01)

(52) U.S. Cl.
    CPC .......... *G06K 9/00597* (2013.01); *G06K 9/6209* (2013.01); *G06K 9/621* (2013.01); *G06K 9/036* (2013.01); *G06K 9/6257* (2013.01); *G06K 9/00281* (2013.01)
    USPC ............ 382/117; 348/673; 382/190; 382/275

(58) Field of Classification Search
    USPC ........... 348/673; 382/117, 118, 190, 195, 275
    See application file for complete search history.

(56) References Cited

U.S. PATENT DOCUMENTS

| | | | |
|---|---|---|---|
| 6,394,602 B1 * | 5/2002 | Morrison et al. | 351/206 |
| 6,714,665 B1 * | 3/2004 | Hanna et al. | 382/117 |
| 7,194,393 B2 * | 3/2007 | Wei et al. | 703/2 |
| 7,689,010 B2 * | 3/2010 | Canzler et al. | 382/118 |
| 8,055,046 B2 * | 11/2011 | Feilkas et al. | 382/131 |
| 8,295,575 B2 * | 10/2012 | Feldman et al. | 382/131 |
| 8,467,627 B2 * | 6/2013 | Gwak et al. | 382/275 |
| 2006/0153430 A1 * | 7/2006 | Canzler et al. | 382/118 |
| 2007/0260157 A1 * | 11/2007 | Norrby | 600/558 |
| 2008/0170770 A1 * | 7/2008 | Suri et al. | 382/128 |
| 2009/0027558 A1 * | 1/2009 | Mantiuk et al. | 348/673 |
| 2010/0316263 A1 * | 12/2010 | Hamza | 382/117 |
| 2012/0321142 A1 * | 12/2012 | Trojanova et al. | 382/117 |

* cited by examiner

*Primary Examiner* — Gregory M Desire
(74) *Attorney, Agent, or Firm* — Schwegman Lundberg & Woessner, P.A.

(57) ABSTRACT

A method and system include receiving an image to process for an image recognition system, determining a quality of the received image, and creating a point distribution model for an active shape model, wherein the point distribution model has a number of points defining an outline of the image, the number of points being determined as a function of the quality of the image. A further method includes selecting a target local appearance model for fitting a point as a function of the determined quality of the received image to determine the location of the point. Yet a further method includes matching the probe image to a plurality of target images using a quality driven cascade classifier.

4 Claims, 6 Drawing Sheets

QUALITY DRIVEN IMAGE PROCESSING FOR OCULAR RECOGNITION SYSTEM

GOVERNMENT FUNDING

This invention was made with Government support under Grant Number W911NF-10-C-0027 awarded by USARMY RDECOM. The United States Government has certain rights in the invention.

BACKGROUND

An active shape model has been used for localization of shapes in images. The active shape model represents the shape by use of a linear statistical model. The object shape is typically represented by N points, and the model is learned from manually annotated data. The number of points representing the model is fixed during a training phase. The number of points remains the same while fitting the shape to an unseen image. Each point of the model can be assigned with a weight. This weight is either entered manually or automatically. However, the number of points remains unchanged. In an active shape model, more points increase the shape fitting performance in an unseen image. On the other hand, a large number of points also accounts for high computational costs.

Biometric identification has been done using the ocular region of faces. Information captured around the ocular region is complementary to iris when the iris acquisition is unconstrained and iris quality is low such as blurred, obscure or gazed. The ocular region contains rich skin micro-pattern texture information, such as pores, spots, wrinkles, flat areas, etc. This information helps to distinguish subjects among themselves. Non skin patterns (eyebrow, tear duct, eye fold), if available, are also relevant. The feature extraction methods (e.g. local binary pattern, histogram of oriented gradients, Gabor wavelets) used for biometry identification are typically used for one fixed resolution. The parameter setting for these methods is optimized for a given image resolution. The various features are fused and form a representation for a given ocular image.

SUMMARY

A method includes receiving an image to process for an image recognition system, determining a quality of the received image, and creating a point distribution model for an active shape model, wherein the point distribution model has a number of points defining an outline of the image, the number of points being determined as a function of the quality of the image.

In a further embodiment, a method includes obtaining multiple local appearance models for an image shape as a function of varying image qualities, storing the multiple local appearance models in a gallery of targets, receiving an image to process for an image recognition system, determining a quality of the received image, and selecting a target local appearance model for fitting a point as a function of the determined quality of the received image to determine the location of the point.

Yet a further method includes extracting features from a probe image corresponding to an image of an unknown subject, and matching the probe image to a plurality of target images using a quality driven cascade classifier.

A system includes a localizer to localize an object in a probe image, an evaluator to receive the localized object and perform a quality evaluation, an aligner to align the object as a function of quality of the probe image and create an active shape model for object in the probe image, and a classifier that classifies the image as a function of quality of the probe image.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that structural, logical and electrical changes may be made. The following description of example embodiments is, therefore, not to be taken in a limited sense, and the scope is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

The active shape model consists of a point distribution model (statistical model represented by mean shape plus shape variations expressed as the transformation matrix controlled by deformation vector) and local appearance model (e.g., a few pixels around each point represented by gradient intensities).

In one embodiment, a determination of the number of points in the shape model is determined based on the quality of the image. The quality in some embodiments is represented by the spatial resolution and spatial frequencies of image (e.g. size of the image, brightness, focus). A high quality image may lead to a point distribution model with fewer points than that used for a low quality image. More points in the point distribution model are used for low quality images.

In a further embodiment, a local appearance model is created during a training phase. In the fitting phase, the intensities around each point are searched and new point location is determined by best match to the local appearance model. When the local appearance model is created for focused images and actual image is blurred, the localization of a point is less precise than if the local appearance model is created for blurred images and compared to actual blur image. Creating various local appearance models and selecting them in a fitting phase based on the image quality helps to determine the best location of points in the image.

In one embodiment, training data is first prepared. Shapes are manually annotated by selecting points in the image (e.g., 20 points on an eye contour). Several point distribution models that vary in number of points representing the shape (e.g., 20, 15, 10 points) are then trained. Taking the available training images and applying the quality metrics (e.g., blur of the image and brightness). The training images are sorted to N-groups based on their quality. For each group of images the local appearance model is trained for each annotated point.

During the fitting phase, the quality of the image is first evaluated using the same quality metrics as in the training phase. Based on the quality, the point distribution model and local appearance model are selected. If the quality metrics are applied on each part of the image separately, the local appearance model selection may vary even among the points. A classical active shape model methodology is applied to fit the model.

In a further embodiment, feature extraction for image classification after training is performed from available image information. A processed image can contain either an ocular region, face, or other biometric sample. The extracted features from the targets images (enrolled in a database), and probe image (image of unknown subject) are matched using a quality driven cascade classifier. In one embodiment, an image is rescaled to several cascades of descending image resolutions. The cascades are processed from the lowest resolution up to the highest resolution available (either in target or probe image). In each cascade the most similar targets are selected and the rest is ignored. Thus the processing is fast and doesn't require matching of every target in each cascade.

In a further embodiment, quality driven matching is performed using weighting of cascades. The similarity scores of N-best matches (most similar target images to given probe) are weighted by quality of actual probe image. For high quality images, all cascades have equal weights. For the low quality image, the higher cascades are assigned with lower weight. The sum of all the weights is equal to one in one embodiment.

In one embodiment, local binary patterns are selected as the method for feature extraction. The parameter setting for feature extraction is tuned for each resolution. At the lowest resolution, the full image is processed. At higher resolutions, the most valuable patches are selected. Patch selection may be done experimentally in some embodiments. For computation of a similarity score between two images such as a target and a probe, a cosine distance is used.

In one embodiment, a target set may be formed from high quality images. The images may be preprocessed and features extracted at three different levels of resolution, such as 64×64, 128×128, and 256×256 pixels. Given a probe image first, the quality may be evaluated, and based on the evaluations, the features are extracted from different resolutions up to the available resolution of the probe image.

The matching of a given probe image is first conducted on the lowest resolution. The most similar targets are selected and matching on higher levels is conducted only for those most similar targets. The process is repeated until the highest resolution is reached. The final scores of the similarity between the probe and selected target images are a combination of score at each cascade multiplied by the probe quality at a given resolution.

Figure 1:
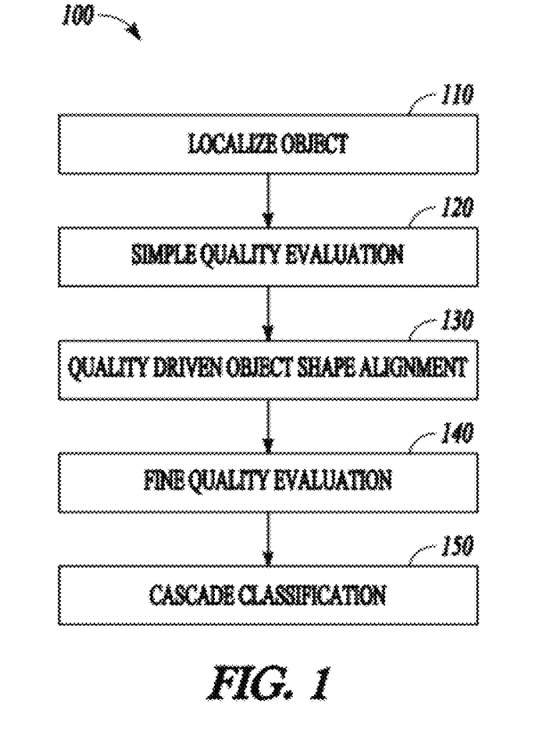
FIG. 1 is an outline of an image recognition process according to an example embodiment.

An outline of an object recognition process is illustrated in flowchart form at 100 in FIG. 1. At 110 an object in the image is localized. Given an input image containing an object to be recognized, the object is first localized to provide a coarse objection location. At 120 a simple quality evaluation is performed. The portion of the image containing the object is evaluated by simple measures. The measures are used to evaluate conditions during the acquisition affecting the image characteristics, such as spatial resolution, spatial frequencies, dynamic range of the image, specular reflection, and other measures of simple quality.

At 130 quality driven object shape alignment is performed. An active shape model is used to localize the object shape. This involves identifying or localizing a boundary of the object. The shape and image are then registered to normalize the size of the object. The object is normalized with respect of objects characteristics in database.

At 140 a fine quality evaluation is performed. Fine quality measures within the object shape are evaluated to provide a fine quality. At 150 a cascade classification is performed. The final matching of the object versus the objects in the database is performed as a function of the actual object qualities such as orientation in space, brightness, focus, etc., leading to identification of an object in the database, or a conclusion that a matching object is not in the database.

With a detected eye, the ocular region is standardized for size and position (with respect to the gallery database samples) at 110. This process is called image registration, and its goal is to transform the image (realign/register) so the key facial landmarks (e.g. eye centers or corners) are located on same position, while keeping the biometric characteristic unchanged (e.g. shape of the eye).

To register a new image, the facial landmark's positions should be precisely detected. Localization of facial landmarks is performed. Without proper localization of facial landmarks, the recognition process may fail. Recognition is more effective if the probe and gallery images are aligned by size and pose. The registration algorithm realigns the image to some degree of variation (limits in one embodiment are: eyebrow moved up/down, out of plane rotation of maximal ±15 degrees). The registration may not be entirely accurate for higher degrees of the pose variation.

In one embodiment, selected datasets may be registered using three cropping methods of automatic registration including using eye centers and a full-face image. Plane rotation is removed, and fixed eye centers located. Eye corners may also be used by removing plane rotation and fixing eye corner positions. A further cropping method uses the bottom eyelid and a point on the eyebrow. The bottom eyelid is fixed to parabola and the orbital distance.

The last method aligns the bottom eyelid to approximately same position. The upper eyelid has a lot of variation (from fully open to closed eye). Additionally, the eye region may be masked out. A set of images to be matched in the gallery database also has the eye region masked out.

The illumination of the images may be normalized in order to reduce the variability of the signal and highlight the local variations of the region. Two types of photometric normalization, self quotient image (SQI) and histogram equalization (HE) may be used.

Image quality assessment is typically used for vision system processing under wide image degradation. The goal of this assessment is to estimate degradations so the best discriminative features are selected for best matching. Quality factors with respect to biometric system performance may be considered. Two main factors influencing the quality are: variation of subject characteristics and conditions during the acquisition.

Quality factors related to the subject include static anatomical characteristics, such as hair (bang on forehead), glasses, permanent jewelry, makeup, and injuries or scars. Dynamic factors corresponding to the behavior of the subject include expression and head pose toward the camera.

In one embodiment, acquisition factors that affect the matching performance include both static and dynamic factors. Static factors relate to the device properties, and dynamic factors relate to environmental conditions. Factors include spatial resolution (eye size and distance between the eyes), spatial frequencies, (brightness, contrast, and focus), dynamic range of ocular region (bits of intensity per pixel), shadows (uneven lighting), and specular reflection (saturation). The selected quality metrics are rather simple and fast. They address: spatial resolution, spatial frequencies, dynamic range of ocular region, and specular reflection. The following quality scores are defined:

Ocular Region Size Score
Dynamic Range Score
Brightness Score
Saturation Score
Out of scope score Each quality score $s_i$ is normalized to the range $\langle 0,1 \rangle$. The total score S is computed as weighted average:

$$S = \frac{1}{N} \sum_i w_i \cdot s_i$$

where $W_i$ is a normalized weight for the different scores. Most of the quality metrics for ocular region build on the cumulative histogram of ocular image.

For the ocular region score, size is indicated by numbers of row and column pixels of cropped eye before registration (number of rows is equal to columns). The eye is cropped by one of the methods described above. If the full face is available, the size of cropped eye is defined by eye distance. In the case of an ocular region, the size is defined by eye width. The mapping between the ocular size and its score is as follows:

<32, 256> pixel⇒ ⟨0 1⟩ score

Thus, any ocular image of 32 pixels or less has a score of 0, and an ocular image of 256 or more pixels has a score of 1. The values between are uniformly distributed.

A dynamic range score may also be calculated. Dynamic range defines intensity density of the image in terms of bits required to represent the actual intensity values (e.g. 8 bits provide $256=2^8$ intensity values). In one embodiment, a grayscale face should be at least 7 bits of intensity variation (i.e. at least 128 unique values). For the ocular region, a limit lower is set with a minimum number of bits of at least 6 (i.e. at least 64 unique intensity values). The number of intensity values (dynamic range) may be determined from cumulative histograms that illustrate dynamic range score examples with various input images.

Brightness refers to the overall lightness or darkness of an image. Brightness can be investigated with a histogram of intensities. The histogram is viewed as a probability distribution function and is typically characterized by statistical moments (mean, variance, skewness, etc.). The Brightness score in one embodiment is derived from cumulative histogram of gray intensity values. A reference value is read at 50%, if the intensity value falls in a predetermined intensity interval the brightness score equals 1. The brightness score decreases for intensity values outside of the ideal interval (bigger or smaller) and score equals 0 at a values on either side of the intensity interval.

A saturation score for saturated image intensity may be derived from a cumulative histogram. The score interval is uniformly distributed across cumulative histogram in one embodiment between zero and one.

Figure 2:
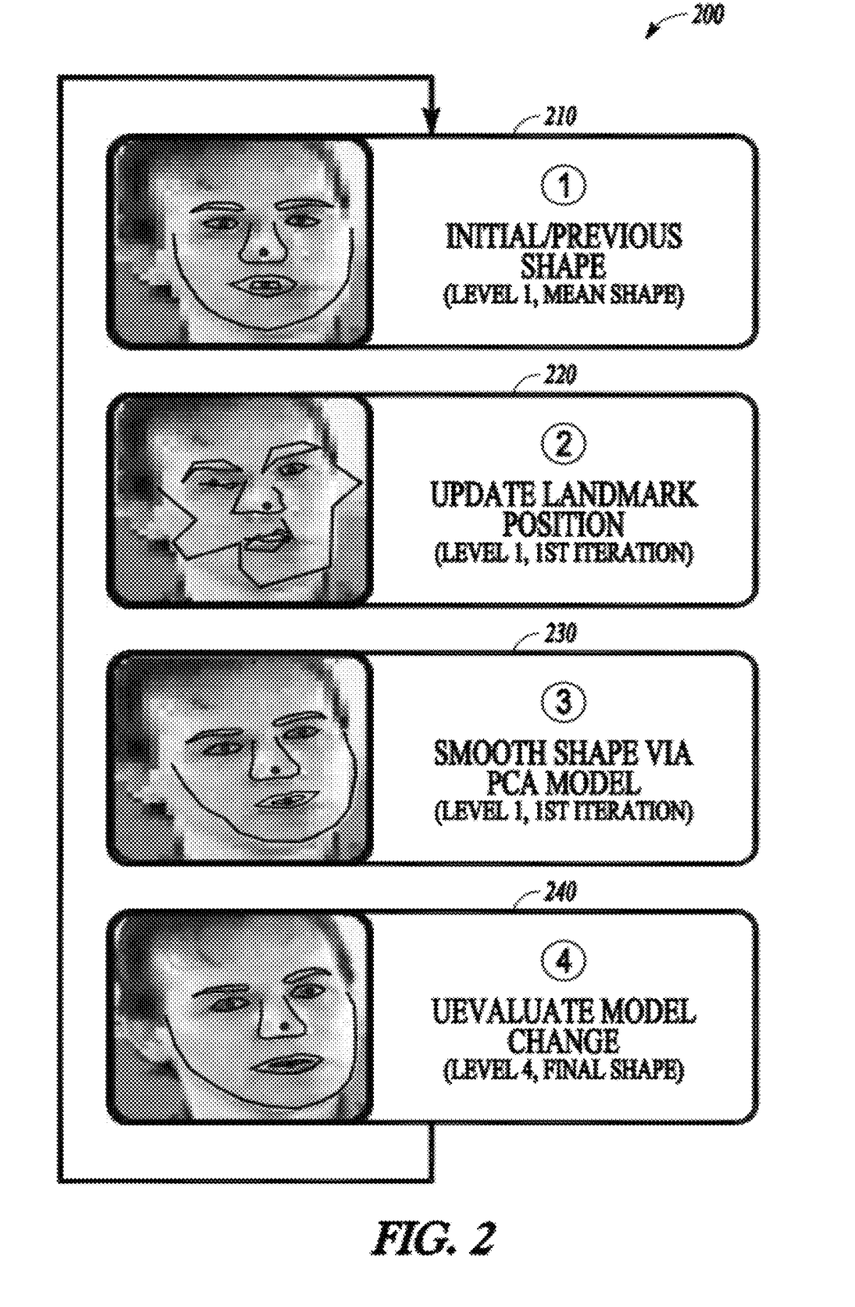
FIG. 2 is a sequence of images corresponding to a quality driven shape location process according to an example embodiment.
Figure 3:
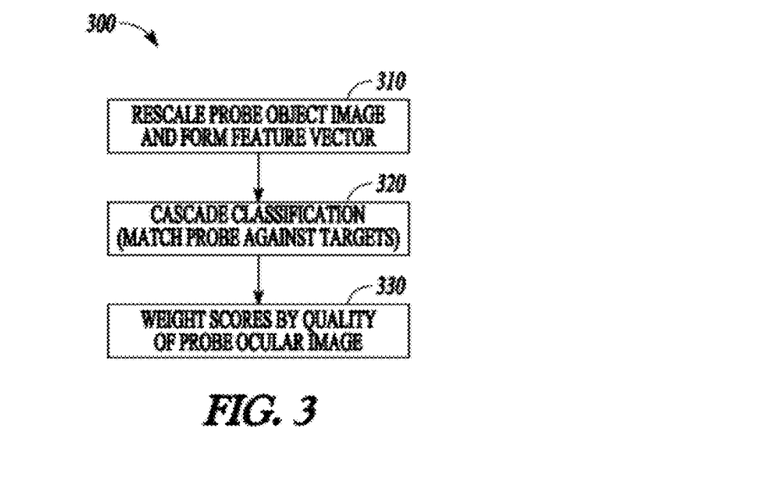
FIG. 3 is a flowchart representation of quality driven cascade classification according to an example embodiment.

FIG. 2 illustrates a sequence of images 200 corresponding to a process of quality driven shape location as referenced at 130. Image 210 illustrates an initial mean shape in level 1, or a previous shape in higher resolutions. 220 illustrates an update landmark position for a first iteration in level 1. 230 represents a smooth shape via a PCA (Principal component Analysis) model for the first iteration in level 1. 240 represents an evaluation model change corresponding to level 4, a final shape. The simple quality of an object that is fit using an active shape model includes multiple parameters. A four step process as shown in FIG. 2 is applied across several resolution levels. The number of levels may depend on the quality, such as for instance, spatial frequencies. The number of landmark points representing the model increases with lower quality. The local appearance model differs for each point. Additionally, the models may be different based on the quality of the image. A flowchart representation of cascade classification corresponding to element 150 is illustrated generally at 300 in FIG. 3. At 310, the probe object image is rescaled and a feature vector is formed. Cascade classification is performed at 315 to match the probe against targets in a database. At 320, scores are weighted by quality of probe ocular image.

Figure 4:
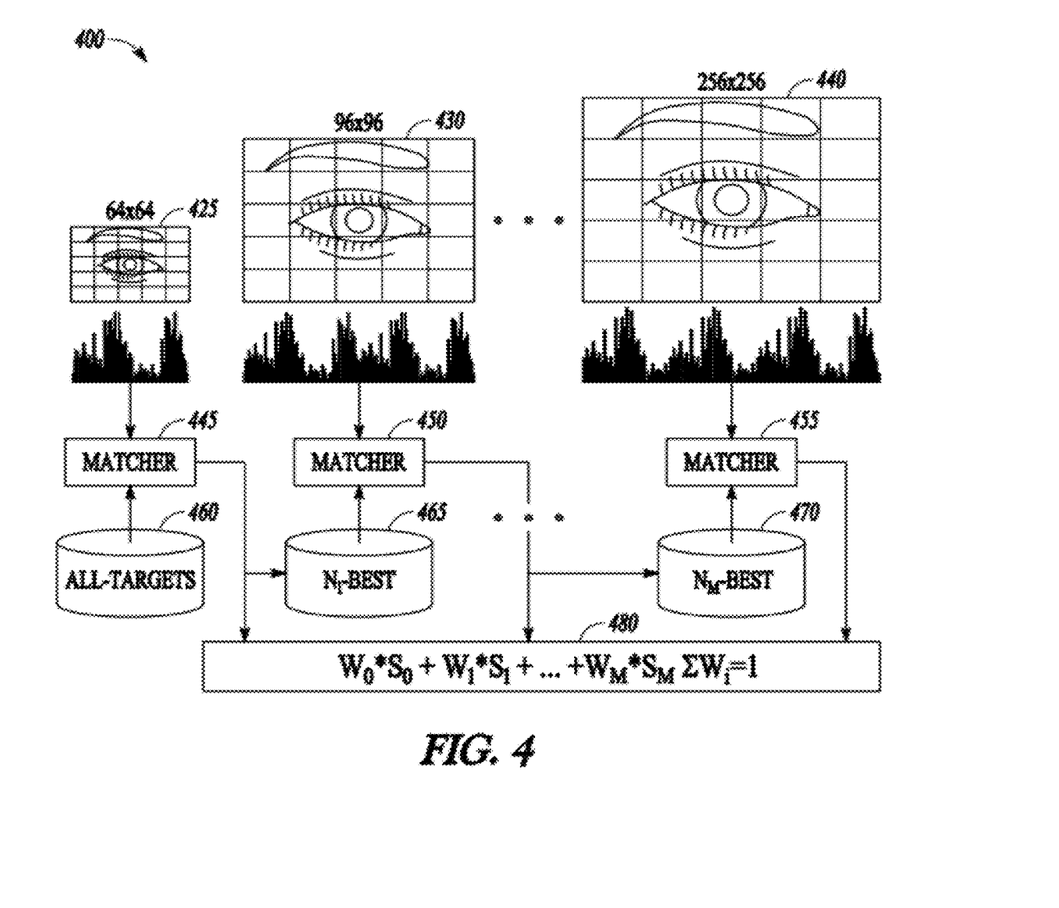
FIG. 4 is a block diagram of a cascade classification system according to an example embodiment.

A block diagram of a cascade system is illustrated at 400 in FIG. 4. Several images of ocular regions containing one or more probes at varying pixel resolutions are illustrated at 425, 430, and 440. Each image is fed into a corresponding matcher 445, 450, and 455 and matched against targets in corresponding databases 460, 465 and 470. The databases have targets with a resolution corresponding to the probe images. At 480, the weighted scores are combined to determine if a match is found. Weights are determined by the probe quality for high quality target images, or are determined by the both target and probe quality estimates.

Figure 5:
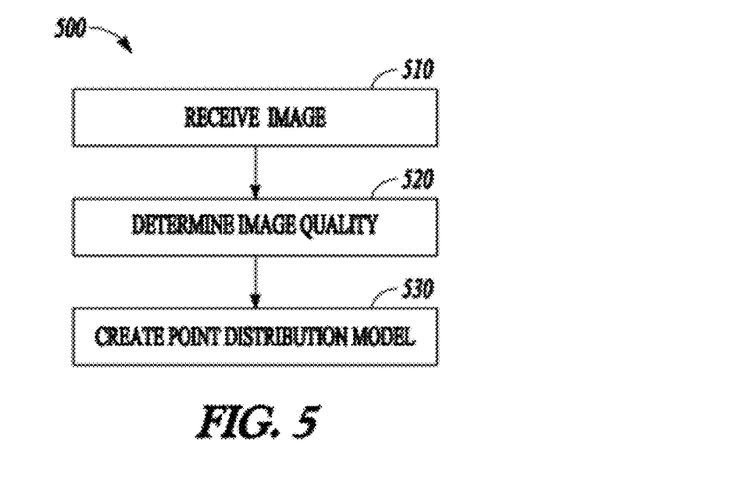
FIG. 5 is a flowchart representation of a method to process a received image according to an example embodiment.

In one embodiment, a method 500 in FIG. 5 includes receiving an image to process for an image recognition system at 510. A quality of the received image is determined at 520. At 530, a point distribution model is created for an active shape model. The point distribution model has a number of points defining an outline of the image, the number of points being determined as a function of the quality of the image.

In one embodiment, image comprises an ocular region of a person. The quality of the received image may be determined as a function of a spatial resolution and spatial frequencies of the received image. The quality of the image includes at least one of size of the image, brightness of the image and focus of the image. The number of points may be inversely related to the quality of the image such that high quality images may be represented by fewer points than images of lower quality.

Figure 6:
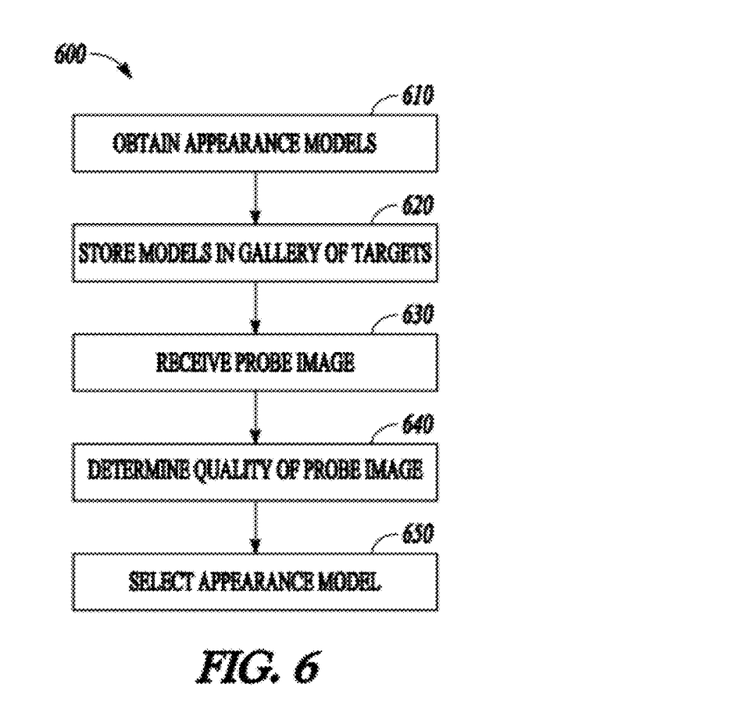
FIG. 6 is a flowchart representation of a method of generating multiple local appearance models for fitting points to the model according to an example embodiment.

In FIG. 6, a method 600 includes obtaining multiple local appearance models for an image shape as a function of varying image qualities at 610. At 620, the multiple local appearance models are stored in a gallery of appearance models. An image is received at 630 to process for an image recognition system. A quality of the received image is determined at 640, and a target local appearance model is selected at 650 for fitting a point as a function of the determined quality of the received image to determine the location of the point.

In one embodiment the local appearance model includes a point from a point distribution model of an active shape model. The point may include a few pixels around each point represented by gradient intensities. The quality may be a function of focus of the image, of brightness of the image, or both. In some embodiments, the selected target appearance model is of the same quality as the received image quality.

Figure 7:
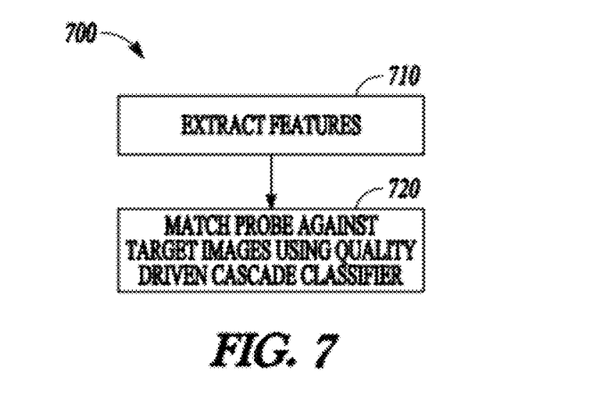
FIG. 7 is a flowchart representation of a method of extracting features from an image and processing via a cascade classification system according to an example embodiment.

In still a further embodiment, a method 700 in FIG. 7 includes extracting features from a probe image corresponding to an image of an unknown subject at 710. The probe image is matched against a plurality of target images using a quality driven cascade classifier at 720. In one embodiment, the probe image is rescaled to several cascades of descending image resolutions, and the cascades are processed from a lowest resolution up to a highest resolution with most similar targets being selected.

Figure 8:
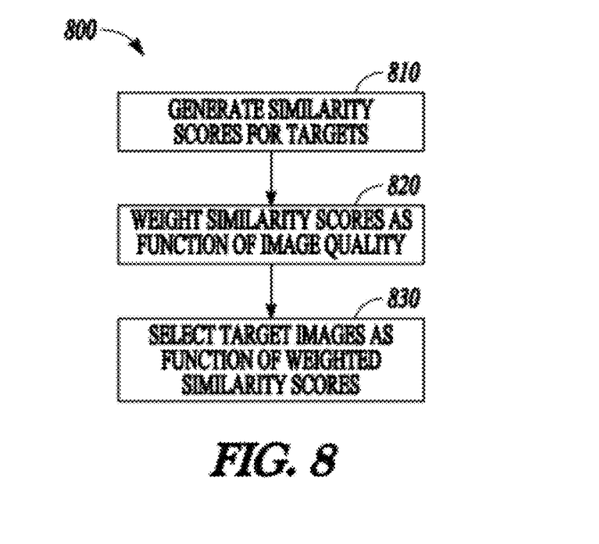
FIG. 8 is a flowchart representation of a method of generating weighted similarity scores for image classification according to an example embodiment.

Matching the probe image to a plurality of target images is shown at a method 800 in FIG. 8. The method 800 includes generating similarity scores at 810 for a plurality of best matches of target images to the probe image. The similarity scores are weighted as a function of image quality at 820. At 830 target images are selected as a function of the weighted similarity scores.

In one embodiment, for probe images that are higher in quality, all cascades are assigned equal weights at 820. This may result in higher quality cascades being assigned a lower weight when matching to a lower quality probe image. The sum of all the weights is equal to one in one embodiment.

Figure 9:
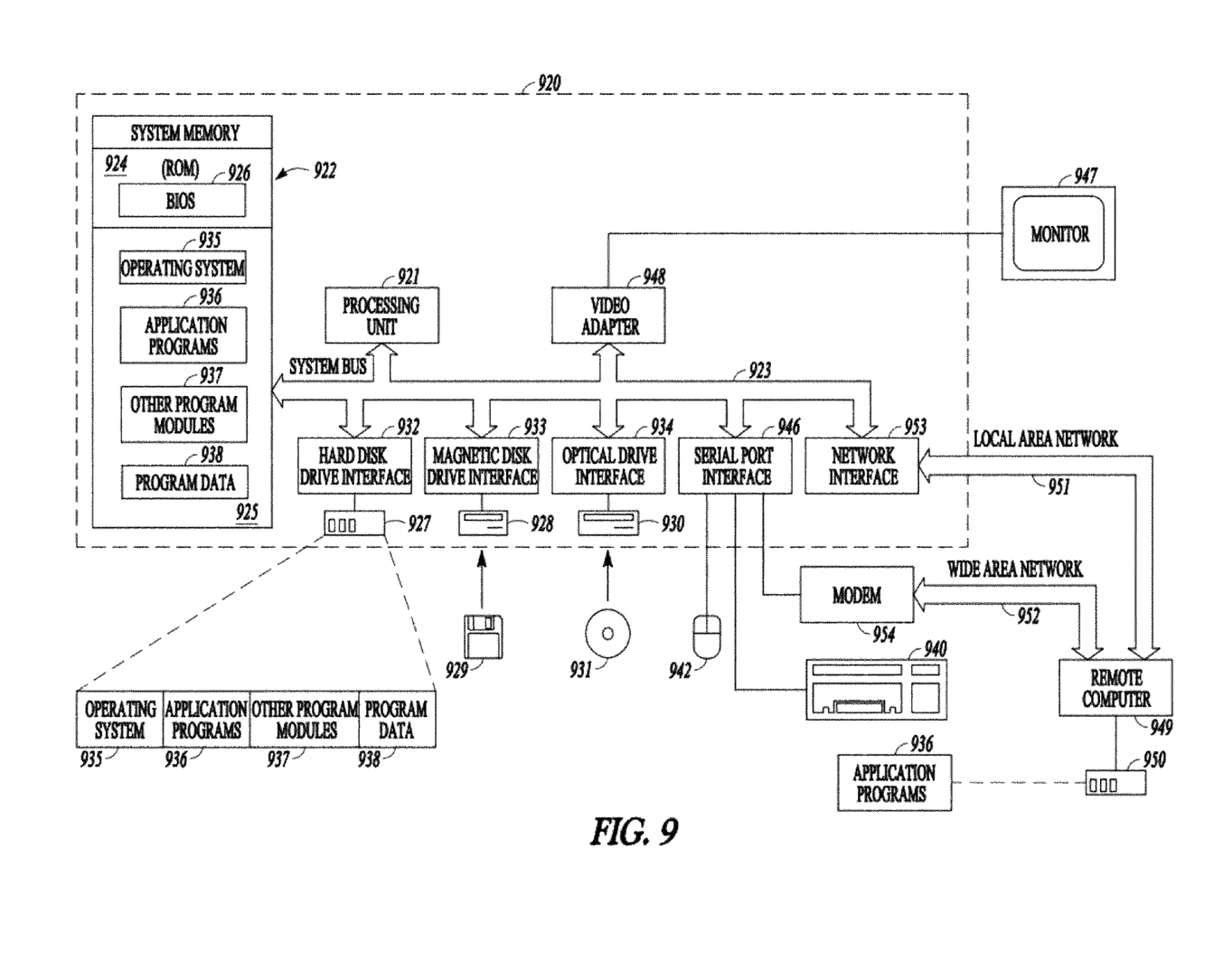
FIG. 9 is a block diagram of a computer system for performing methods according to an example embodiment.

FIG. 9 is a block diagram of a computer system to implement methods according to an example embodiment. In the embodiment shown in FIG. 9, a hardware and operating environment is described to facilitate execution of code to implement the methods.

As shown in FIG. 9, one embodiment of the hardware and operating environment includes a general purpose computing device in the form of a computer 900 (e.g., a personal computer, workstation, or server), including one or more processing units 921, a system memory 922, and a system bus 923 that operatively couples various system components including the system memory 922 to the processing unit 921. There may be only one or there may be more than one processing unit 921, such that the processor of computer 900 comprises a single central-processing unit (CPU), or a plurality of processing units, commonly referred to as a multiprocessor or parallel-processor environment. In various embodiments, computer 900 is a conventional computer, a distributed computer, or any other type of computer.

The system bus 923 can be any of several types of bus structures including a memory bus or memory controller, a peripheral bus, and a local bus using any of a variety of bus architectures. The system memory can also be referred to as simply the memory, and, in some embodiments, includes read-only memory (ROM) 924 and random-access memory (RAM) 925. A basic input/output system (BIOS) program 926, containing the basic routines that help to transfer information between elements within the computer 900, such as during start-up, may be stored in ROM 924. The computer 900 further includes a hard disk drive 927 for reading from and writing to a hard disk, not shown, a magnetic disk drive 928 for reading from or writing to a removable magnetic disk 929, and an optical disk drive 930 for reading from or writing to a removable optical disk 931 such as a CD ROM or other optical media.

The hard disk drive 927, magnetic disk drive 928, and optical disk drive 930 couple with a hard disk drive interface 932, a magnetic disk drive interface 933, and an optical disk drive interface 934, respectively. The drives and their associated computer-readable media provide non volatile storage of computer-readable instructions, data structures, program modules and other data for the computer 900. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 929, optical disk 931, ROM 924, or RAM 925, including an operating system 935, one or more application programs 936, other program modules 937, and program data 938. Programming for implementing one or more processes or method described herein may be resident on any one or number of these computer-readable media.

A user may enter commands and information into computer 900 through input devices such as a keyboard 940 and pointing device 942. Other input devices (not shown) can include a microphone, joystick, game pad, satellite dish, scanner, or the like. These other input devices are often connected to the processing unit 921 through a serial port interface 946 that is coupled to the system bus 923, but can be connected by other interfaces, such as a parallel port, game port, or a universal serial bus (USB). A monitor 947 or other type of display device can also be connected to the system bus 923 via an interface, such as a video adapter 948. The monitor 947 can display a graphical user interface for the user. In addition to the monitor 947, computers typically include other peripheral output devices (not shown), such as speakers and printers.

The computer 900 may operate in a networked environment using logical connections to one or more remote computers or servers, such as remote computer 949. These logical connections are achieved by a communication device coupled to or a part of the computer 900; other types of communication devices may also be used. The remote computer 949 can be another computer, a server, a router, a network PC, a client, a peer device or other common network node, and typically includes many or all of the elements described above I/O relative to the computer 900, although only a memory storage device 950 has been illustrated. The logical connections depicted in FIG. 9 include a local area network (LAN) 951 and/or a wide area network (WAN) 952. Such networking environments are commonplace in office networks, enterprise-wide computer networks, intranets and the internet, which are all types of networks.

When used in a LAN-networking environment, the computer 900 is connected to the LAN 951 through a network interface or adapter 953, which is one type of communications device. In some embodiments, when used in a WAN-networking environment, the computer 900 typically includes a modem 954 (another type of communications device) or any other type of communications device, e.g., a wireless transceiver, for establishing communications over the wide-area network 952, such as the internet. The modem 954, which may be internal or external, is connected to the system bus 923 via the serial port interface 946. In a networked environment, program modules depicted relative to the computer 900 can be stored in the remote memory storage device 950 of remote computer, or server 949. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The invention claimed is:

1. A method comprising:
   receiving, at a processor, an ocular image to process for an ocular recognition system;
   determining, via the processor, a quality of the received image;
   selecting a local appearance model from multiple local appearance models based on different image quality; and
   creating, via the processor, a point distribution model from the local appearance model, stored on a machine readable storage device, for an active shape model, wherein the point distribution model has a number of points defining an outline of the image, the number of points being determined as a function of the quality of the image.

2. The method of claim 1 wherein the quality of the received image is determined as a function of a spatial resolution and spatial frequencies of the received image.

3. The method of claim 2 wherein the quality of the image includes at least one of size of the image, brightness of the image and focus of the image.

4. The method of claim 1 wherein the number of points of the point distribution model is inversely related to the quality of the image.

* * * * *